United States Patent
Borta

(10) Patent No.: US 6,445,960 B1
(45) Date of Patent: *Sep. 3, 2002

(54) ELECTRIC MOTION PLATFORM AND A CONTROL SYSTEM FOR CONTROLLING THE SAME

(75) Inventor: Ronald T. Borta, Sterling, VA (US)

(73) Assignee: Ronbotics Corporation, Manassas, VA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/086,676

(22) Filed: May 29, 1998

(51) Int. Cl.$^7$ .............................................. G05B 13/02
(52) U.S. Cl. .................. 700/28; 74/490.03; 74/479; 74/471 XY; 434/30; 434/55; 472/59; 273/119; 463/37
(58) Field of Search .................. 700/28; 74/490.03, 74/471 XY, 479; 434/30, 55; 472/59; 273/119; 463/37

(56) References Cited

U.S. PATENT DOCUMENTS

| | | |
|---|---|---|
| 3,675,927 A | 7/1972 | Gottlieb et al. |
| 4,650,190 A | 3/1987 | Geiger |
| 5,112,049 A | 5/1992 | Borg |
| 5,237,887 A * | 8/1993 | Appleberry .............. 74/490.03 |
| 5,294,172 A | 3/1994 | Dubus |
| 5,353,242 A * | 10/1994 | Crosbie et al. ................. 703/8 |
| 5,611,731 A | 3/1997 | Bouton et al. |
| 5,772,513 A | 6/1998 | Ohishi |
| 5,901,612 A * | 5/1999 | Letovsky ............... 74/471 XY |
| 5,952,796 A * | 9/1999 | Colgate et al. ................ 318/1 |
| 5,954,508 A * | 9/1999 | Lo et al. ....................... 434/55 |
| 5,980,255 A * | 11/1999 | Mathieu et al. ............... 434/30 |
| 6,077,078 A * | 6/2000 | Alet et al. ..................... 434/55 |
| 6,095,926 A * | 8/2000 | Hettema et al. .............. 472/59 |
| 6,132,314 A | 10/2000 | Aiki |
| 6,142,877 A | 11/2000 | Nishimura |

OTHER PUBLICATIONS

Ronbotics Corporation Motion Ride "CoasterRider X–Press" (1999).
Motionbase Brochure, "Interactive leisure simulators, Electrical motion platforms, Visual display systems, Multiple seat motion rides" (Motionbase plc 1997).
Adventure Quest Brochure, "Now" (pre–1998).
Flight Avionics Brochure, "New '98 Premiering at IAAPA" (1998).
Astro Game Products, Inc. Brochure, "Interactive 3D Viper Flight simulator" (pre–1998).

(List continued on next page.)

Primary Examiner—David Wiley
Assistant Examiner—Frantz B. Jean
(74) Attorney, Agent, or Firm—Foley & Lardner

(57) ABSTRACT

A motion platform comprises a base, a top, a pair of positioning motor assemblies mounted to the base, and an arm assembly extending between each of the positioning motor assemblies and the top of the platform. Each of the arm assemblies is responsive to rotary motion of a respective one of the positioning motor assemblies and includes a rotating arm mounted at one end on the motor shaft and rotatable over a full 360-degree arc. Sensors detect the position of the arm assemblies and the speed and amount of rotation of the positioning motor assemblies. The motion platform further comprises a microcontroller, electrically connected to the positioning motor assemblies and responsive to input commands and to signals from the sensors, for controlling rotational speed, rotational direction and rotational extent of the positioning motor assemblies and thus angular displacement of the top of the motion platform relative the base. The motion platform has two degrees of freedom, pitch and roll, to mimic real world motion.

30 Claims, 8 Drawing Sheets

OTHER PUBLICATIONS

Evans & Sutherland Web Page, "Cyber Fighter" at http://www.es.com/Products/Edutain/cyberfighter.html (Nov. 3, 1997).

MaxFlight Corporation Interactive Ride Systems Brochure, "Get Ready for Some SeriousMotion—Introducing The Next Generation in Motion Technology" (pre–1998).

Sarnicola Simulation Systems, Inc. Advertising Materials (pre–1998).

Thompson Entertainment News Bulletin, "Unreal", vol. 3 (1997).

MaxFlight Corporation Interactive Ride System Brochure, "VR2002 Roller Coaster" (pre–1998).

Stricor, Inc. Brochure, "Xtreme–Descent II" (pre–1998).

Namco America, Inc. Brochure, "Final Furlong" (1997).

Winble, Inc. Brochure, "Winble Ride Machine 'Wave'" (pre–1998).

Adventure Quest, LLC. Brochure, "Personal Motion Theatre M–4" (pre–1998).

Letovsky Dynamics News Bulletin, "News In Motion", vol. 1 (1997).

Servos & Simulation, Inc. Brochure, "Electric Motion System Two Degrees of Freedom Model 710LP–2" (1997).

Moog Brochure, "Moog Electric Motion Simulators" (pre–1998).

Servos & Simulation, Inc. Brochure, "Six Degrees of Freedom Electric Motion System Model 710–6–2000" (1997).

Servos & Simulation, Inc. Brochure "Two Degrees of Freedom Electric Motion System Model 710–2" (1997).

Servos & Simulation, Inc. Brochure "Electric Motion System High Angle Two Degrees of Freedom" (1997).

Servous & Simulation, Inc. Brochure Three Degrees of Freedom Electric Motion System Model 710–3–2000 (1997).

MaxFlight Corporation Interactive Ride Systems Brochure, "VR2000 Flight Simulator" (pre–1998).

* cited by examiner

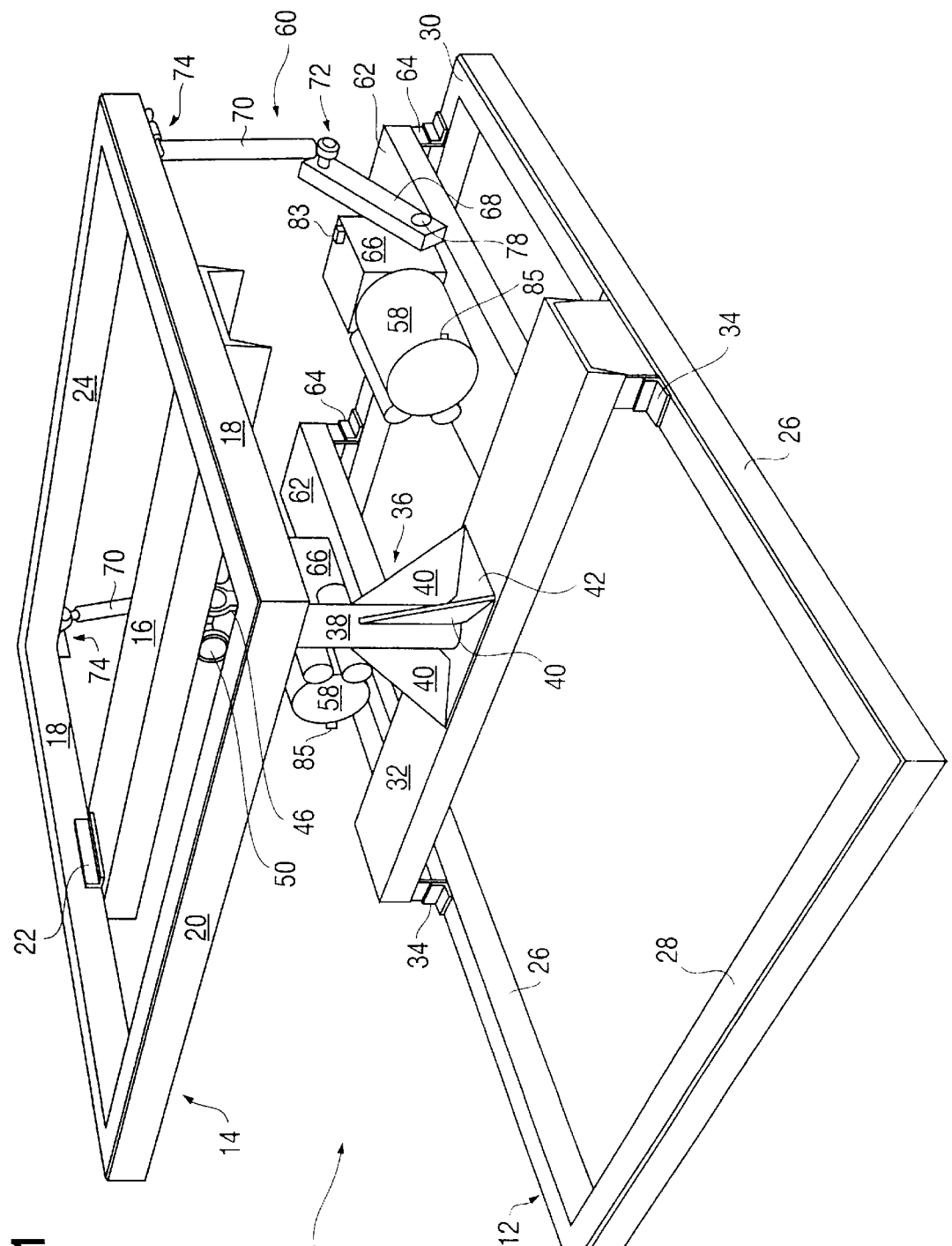

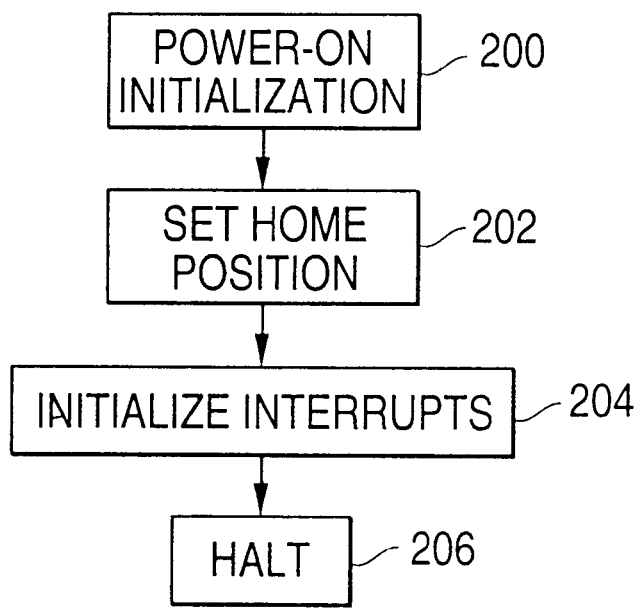
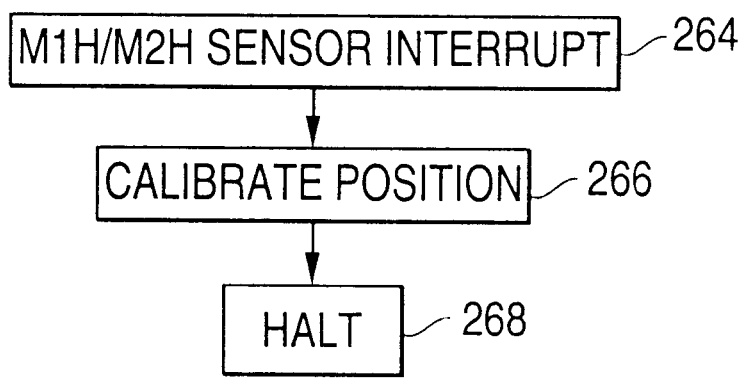

ELECTRIC MOTION PLATFORM AND A CONTROL SYSTEM FOR CONTROLLING THE SAME

BACKGROUND OF THE INVENTION

This invention relates to a novel electric motion platform and control system for controlling movement of the same. More specifically, this invention relates to an electric motion platform for simulating real world motion under direction of a computer or other external device.

Motion platforms may be found in both military and commercial environments, for example in flight simulators, coin-operated entertainment rides, medical research, and, more recently, virtual reality machines. In a typical application, one or two person module, such as a simulated "cockpit" in a flight training system, is mounted to the motion platform. As the user watches screens displayed in the module, the platform moves so that the user experiences true-to-life motion cues. Motion platforms for commercial flight simulation are designed for accuracy and, consequently, are quite expensive.

Conventional motion platforms that attempt to simulate real world motion suffer several drawbacks. The motion platforms are complicated in structure, having many distinct moving parts, and thus are expensive to manufacture and maintain. In addition, the movement of the motion platform is somewhat restricted. Conventional motion platforms undergo what is referred to as quadrature motion, driven by a motor and a pair of arms, one of which is connected to the platform. In these conventional motion platforms, as exemplified in FIG. 2A, arms 200 and 202 are connected to a motor box 204 that rests on a platform base 204. Arm 202 connects to a corner of the platform (not shown), and an identical motor and arm assembly is at an opposite corner of the platform. As is evident from the figure, the movement of arm 200 in a downward direction is limited by the base, with the result that the maximum angular deflection of the platform is that which results from motion of the arms over a single 90° arc or quadrant in the direction of arrow A. Movement of the motion platform itself thus is usually restricted to about ±15 degrees from a plane parallel to the ground surface.

Another disadvantage of conventional motion platforms is that, because of the 90° orientation of the arms at the start position, the motor is at its highest load when started. Accordingly, these platforms require large, heavy motors, which are both heavy and costly. While weight and cost may not be significant factors for custom designed motion platforms used for military or high-end commercial applications; they have limited the application of such platforms in entertainment and other potential commercial applications.

Further, the prior art motion platforms are relatively large and occupy lots of floor space. This is undesirable where it is desired to offer a selection of games, each mounted on its own motion platform. The size and weight of these bulky platforms makes then difficult and expensive to ship and install.

Conventional motion platforms generally suffer from another drawback in that the structure is relatively tall to accommodate the complex and sizable motors, control linkages and electronics of the overall system. This requires the passenger module to be mounted high above the floor, necessitating that the "rider" climb up into position. Climbing into an elevated user module is awkward and presents a safety risk often requiring a trained operator to be present during operation.

For these and other reasons, the motion platforms heretofore available have not proven to be entirely satisfactory and have not been fully suitable for practical application to the entertainment industry and to other commercial applications in which cost, size, convenience, safety, adaptability and ease of use are important factors.

SUMMARY OF THE INVENTION

Accordingly, it is therefore a general object of the present invention to provide a motion platform and control system for controlling movement of the same which will obviate or minimize difficulties of the type previously described.

It is a specific object of the invention to provide a general purpose, digitally controlled motion platform and associated control system that has a wide variety of applications.

It is another object of the invention to provide a motion platform that has relatively few moving parts and is relatively lightweight and compact.

It is still another object of the invention to provide a motion platform that offers a range of motion of up to ±35 degrees from level.

It is yet still another object of the invention to provide a motion platform that occupies a relatively small amount of floor space.

It is a further object of the invention to provide a motion platform that has a seat portion relatively close to the ground so that a user can easily climb into and exit a user module mounted on the motion platform without the assistance of a trained operator.

It is yet a further object of the invention to provide a motion platform that only needs a relatively small motor to operate.

It is still a further object of the invention to provide a motion platform that may be mass-produced at relatively low cost.

It is yet still a further object of the invention to provide a control system for a motion platform that enables real time monitoring of movement of the motion platform and reaction to that movement.

A preferred embodiment of the invention which is intended to accomplish at least some of the foregoing objects includes a motion platform comprising a base, a top, and a support member for supporting the top relative to the base. The motion platform also has a pair of positioning motor assemblies mounted to the base and an arm assembly extending between each of the positioning motor assemblies and the top of the platform. The arm assemblies are responsive to rotary motion of a respective one of the positioning motor assemblies and are adapted to rotate 360 degrees about the respective positioning motor assembly. The motion platform further includes a microcontroller electrically connected to the positioning motor assemblies for controlling rotational speed and rotational direction of the positioning motor assemblies and thus angular displacement of the top of the motion platform relative to the base. The motion platform has two degrees of freedom, pitch and roll.

The base and the top of the motion platform may be constructed of any suitable material and are preferably composed of an aluminum alloy. The base and the top are also preferably one-piece frames of a rectangular configuration.

The motion platform may also have solid state relay and delay circuitry electrically connected between the positioning motor assemblies and the microcontroller to allow relatively instantaneous reversal of direction of rotation of the positioning motor assemblies. The motor assemblies are mounted above the base of the motion platform so that the arm assemblies may be rotated over a full 360-degree arc.

Each positioning motor assembly preferably includes a positioning motor and a reducer gear. The reducer gear is coupled between a respective arm assembly and positioning motor. Each arm assembly preferably includes a rotating arm for connection at one end to an output shaft of the reducer gear, a connecting arm linking the platform top to the rotating arm, and a joint for coupling the rotating arm to the connecting arm to allow angular displacement of the connecting arm relative to the rotating arm. When the top is at a start or level position, the rotating arm and connecting arm form an obtuse angle, requiring less start-up work by the motor.

The arm assembly is mounted between the positioning motor assembly and the platform top to displace the top up to ±35 degrees from an imaginary plane level with a ground surface.

The motion platform may further include first sensors for detecting when an arm assembly is in a home, position and second sensors for sensing the speed and amount of rotation of each of the positioning motors. The second sensors detect passage of the fan blades of the motor assemblies to monitor both speed and amount of rotation.

A control system for controlling movement of motion platform in accordance with the present invention includes a power supply and a microcontroller having an input, an output, and a memory. At least two positioning motors are electrically connected to at least two solid state relays electrically connected to the output of the microcontroller. A first set of sensors detects when the connecting arms of linkage assemblies between the base and the top of the platform are in a predetermined home position, and a second set of sensors determines the speed and extent of rotation of each of the positioning motors. The microcontroller controls the speed and direction of the positioning motors based on command signals input into the microcontroller. The sensors may be of any suitable type but preferably comprise LEDs and photo-transistors.

A method for controlling movement of a motion platform includes the steps of: initializing the motion platform so that a top of the motion platform is level; receiving data input into a data entry unit, the data being converted into signals for controlling activation, speed, and direction of rotation of positioning motors for positioning the motion platform; activating the positioning motors in response to the received data; and when the positioning motors are activated, moving the positioning motors in a specific direction and at a specific speed in response to the received data to orient the motion platform. The data entry unit receives at least one of real-time data or predetermined data.

Additional objects and advantages of the invention will be apparent to those of ordinary skill in the art from the following description of a preferred embodiment, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

FIG. 1 is a perspective view of a preferred embodiment of a motion platform in accordance with the present invention;

FIGS. 6A through 6E are program flow charts of the microcontroller program which controls operation of the motion platform in accordance with the invention.

DETAILED DESCRIPTION OF THE PREFERRED EMBODIMENT

Figure 2A:
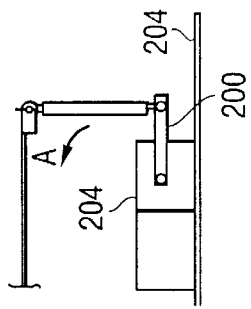
FIG. 2A is a side elevation view of a motor and arm assembly of a prior art motion platform.

Referring now to the drawings, wherein like numerals indicate like parts, and initially to FIG. 1, there will be seen a motion platform, generally indicated 10, in accordance with the invention. The motion platform 10 includes a base 12 and a top 14 for supporting a user module (not shown). The user module may be a flight simulator module, an entertainment ride film module, a game module or any other desired type of module pod or body designed to simulate a real world device or vehicle. The base 12 and the top 14 are generally rectangular. One of skill in the art, however, will readily recognize that either or both of the top and the base may have different cross-sectional shapes, such as circles, rectangles, hexagons and the like.

The top 14 and the base 12 preferably are formed from a single piece of metal, bent into the rectangular configuration shown in FIG. 1. The top 14 and the base 12 are preferably composed of an aluminum alloy, which reduces the overall weight of the motion platform relative to conventional motion platforms made of steel. Standard aluminum alloy, in standard mill sizes, provides an adequate strength-to-weight ratio, well above required safety limits for motion platforms. While weighing significantly less than steel and having excellent working characteristics, the aluminum design lends itself to automated manufacturing techniques required to produce large quantities and low cost. It will be understood, however, that the subject motion platform 10 may also be made of steel or any other material suited to the intended application.

The top 14 has a first beam 16 extending between two side arms 18 of the top 14. When a user module is mounted on the motion platform 10, the first beam 16 may serve as a seat, with space for placement of the legs between the first beam 16 and a front arm of the top 14. By positioning the seat close to ground level, the subject invention provides a platform that is easy for a user to enter and exit without the assistance of a trained operator. The first beam 16 is mounted to the side arms 18 by mounting brackets 22. The top 14 of the motion platform 10 is completed by a rear arm 24.

Figure 4:
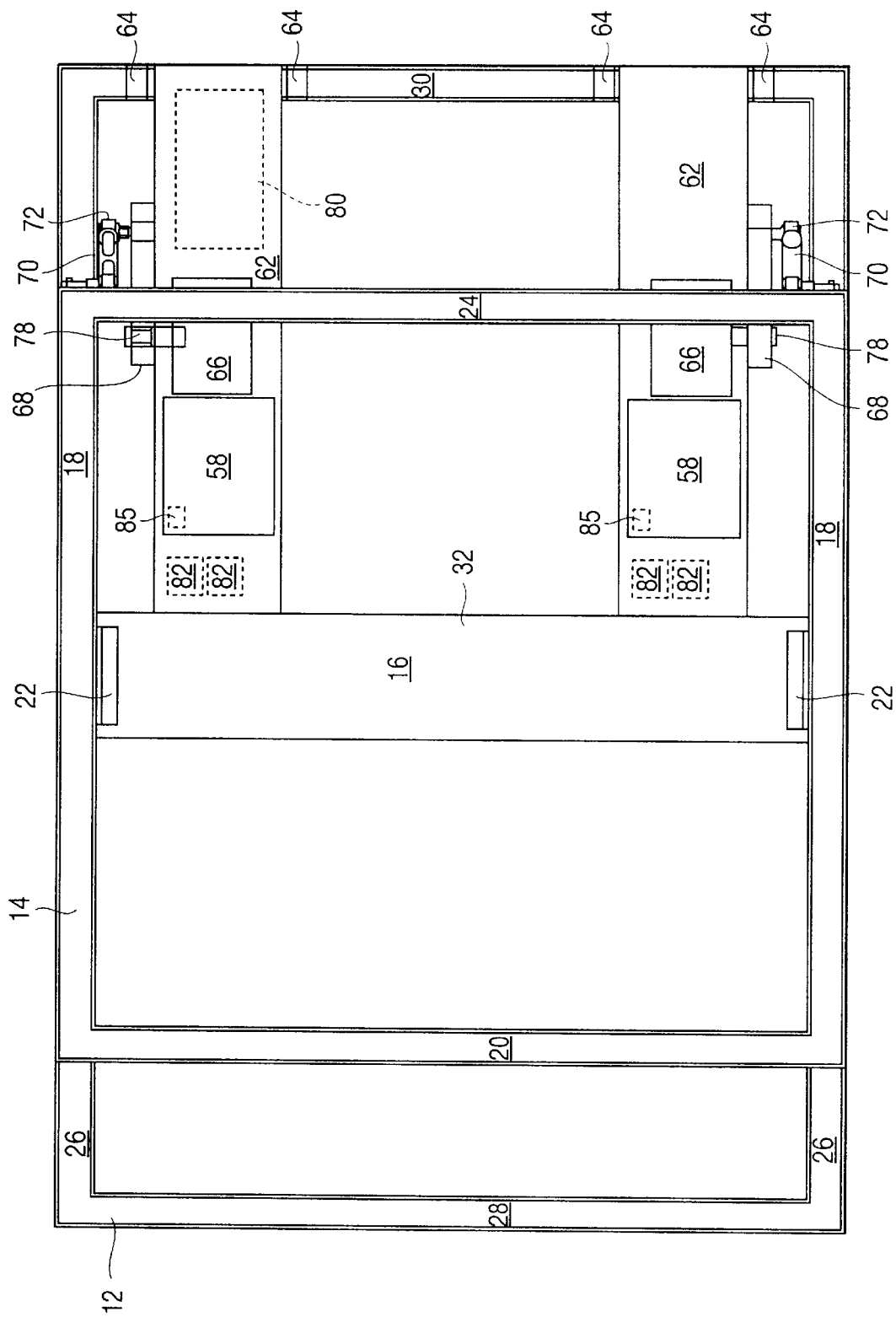
FIG. 4 is a top plan view of the motion platform of FIG. 1.

Like the top 14, the base 12 includes side arms 26, a front arm 28, and a rear arm 30. The perimeter of the base 12 bounds an area of generally larger cross-section than the perimeter of the top 14, as best seen in FIG. 4.

A second beam 32 extends between the two side arms 26 of the base 12. This second beam 32 is slightly elevated from the side arms 26 by stepped mounting brackets 34. These brackets may be standard mill-shaped, U-channel brackets.

A support member, generally indicated 36, supports the top 14 relative to the base 12. The support member 36 supports all of the weight of the top 14 and any attached user module. The support member 36 includes a hollow support beam 38, here shown as a cylindrical post, that vertically extends between a center of the first beam 16 and a center of the second beam 32. The support member 36 further includes fins 40 extending from an outer surface of the support beam 38 to the second beam 32. The fins 40 can attach either directly to the second beam 32 or, as shown in FIG. 1, to a plate 42 mounted on the second beam 32. The embodiment shown in FIG. 1 has four fins 40 extending to the four corners of the plate 42. The fins 40 reinforce the support beam 38. This reinforced support beam 38 provides maximum stiffness and strength to the motion platform and, in combination with a joint 44, discussed below, supports the load of the top 14 and any additional load, such as a user and user module.

Figure 2:
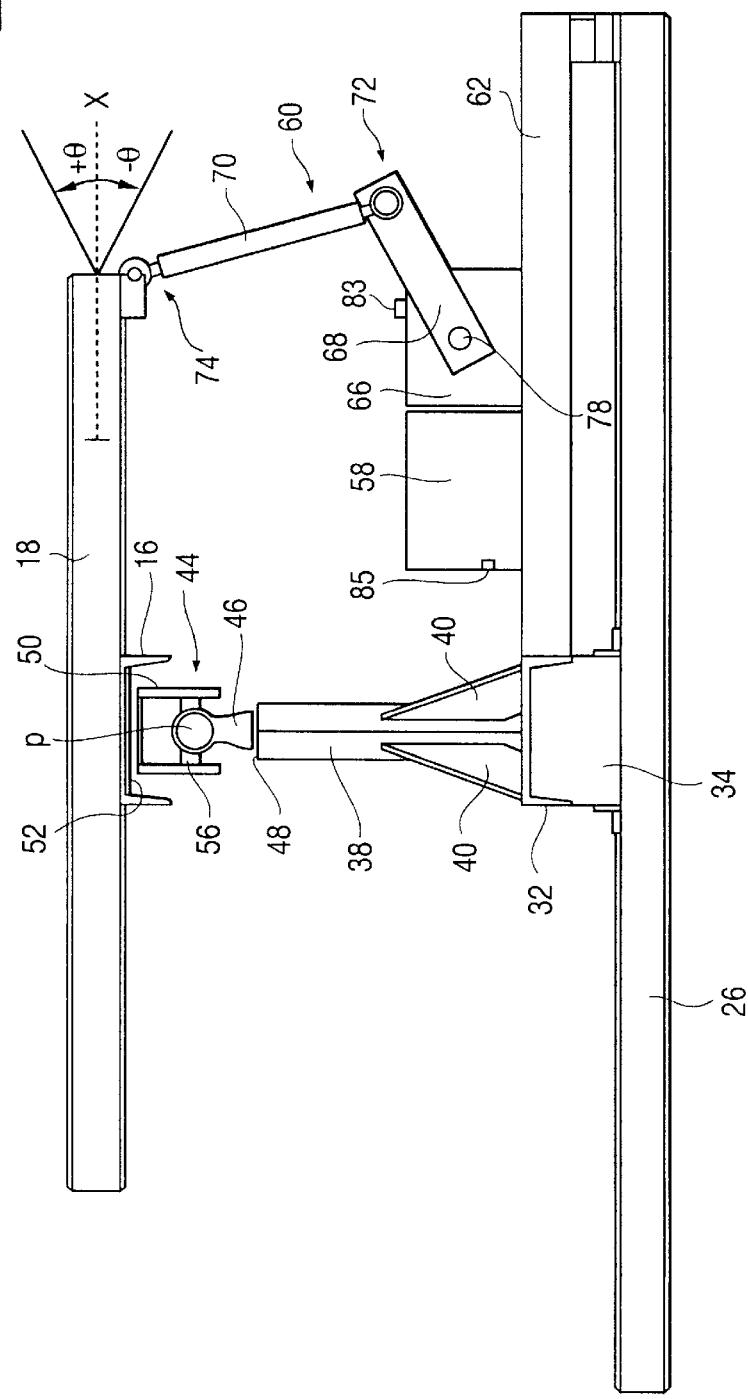
FIG. 2 is a side elevation view of the motion platform of FIG. 1.

As seen in FIG. 2, a joint, generally indicated 44, is positioned between the support beam 38 and the first beam 16. The joint 44, which is preferably a heavy industrial universal joint or U-joint, allows a desired degree of pitch and roll of the top of up to ±35 degrees relative to the base. The joint 44 has a first fixed member 46 mounted to a top 48 of the support beam 32. The joint 44 slips inside the support beam 38 and is welded around its perimeter. The joint 44 also has a second fixed member 50 mounted to a bottom surface 52 of the first beam 16. First and second fixed members 46 and 50 are generally U-shaped and are oriented 90 degrees with respect to each other about a vertical axis. Interconnecting the distal ends of members 46 and 50 is a cross-shaped pivot member 56 which is rotatably mounted with respect to both members 46 and 50. The joint 44 provides pivot points P and P' that enable the top 14 to move in two degrees of freedom pivot relative to the support beam 38.

Figure 3:
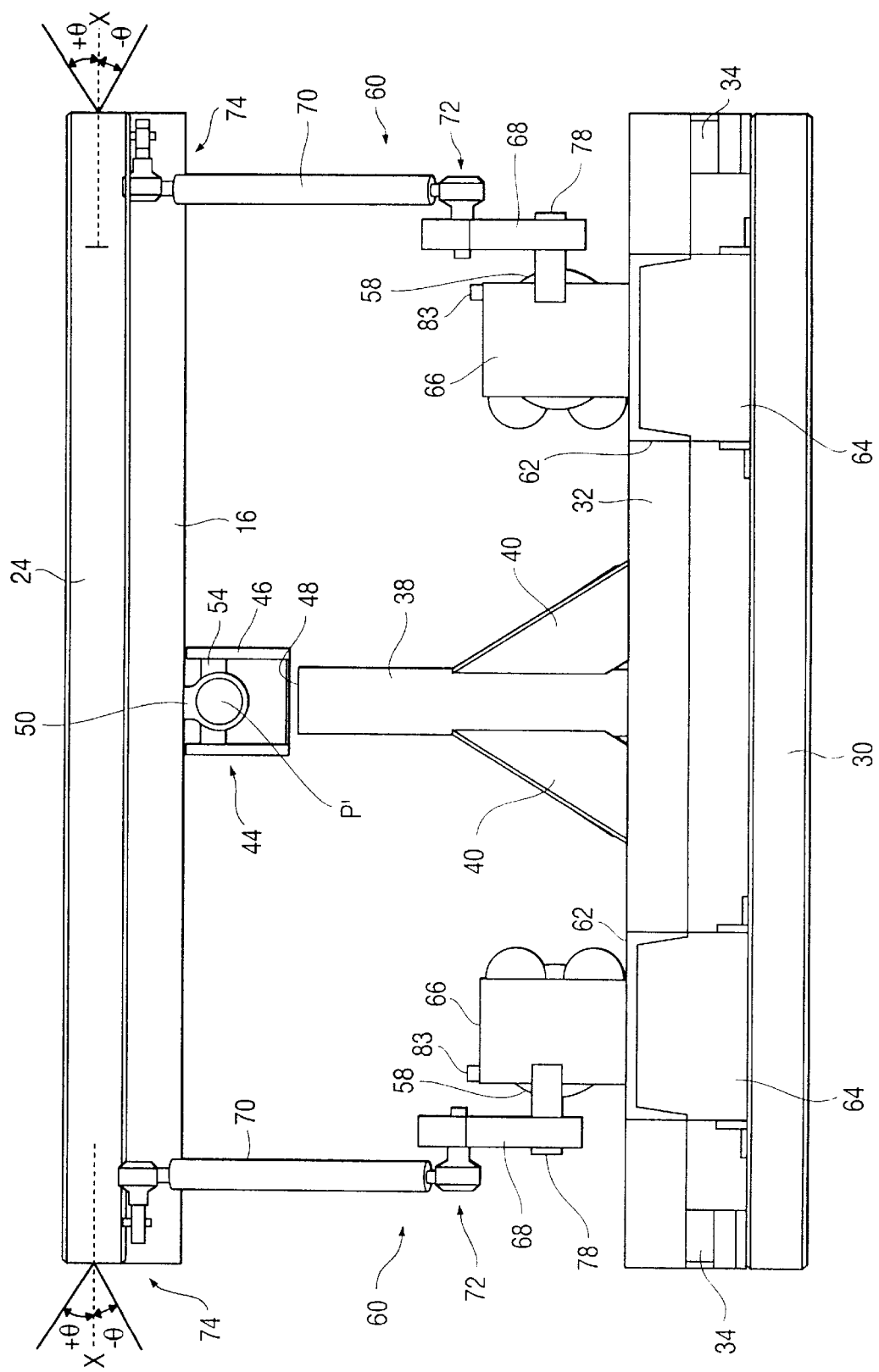
FIG. 3 is a rear elevation view of the motion platform of FIG. 1.

The motion platform also includes a pair of positioning motors 58 that rotate a pair of arm assemblies, generally indicated 60, to enable up to a ±35 degree range of motion of the top 14 relative to a horizontal plane shown as plane X in FIGS. 2 and 3. The pitch, or up down, movement of the motion platform 10 is shown as ±Θ in FIG. 2. When the platform moves at a ±Θ angle, the front arm 20 of the top 14 moves down. When the platform moves at a −Θ angle, the front arm 20 moves up. The angle Θ is also shown in FIG. 3 to show the range or extent of roll of the top 14 of the platform 10.

The positioning motors 58 are mounted on motor support beams 62, which in turn extend between the second beam 32 and the rear arm 30 of the base 12. The motor support beams 62 elevate the positioning motors 58 above the plane of the base 12. The motor support beams 62 are mounted to the rear arm 30 by stepped mounting brackets 64 and attach directly to the second beam 12.

The positioning motors 60 are high torque motors. They provide the rotary motion to rotate the arm assemblies 60. To achieve accurate positioning of the top 14 through rotation of the arm assemblies 60, the motors can be instantly reversed to provide braking or to provide reverse motion, as required and as will be more fully described below.

The motion platform 10 further includes a reducer gear 66 coupled between each positioning motor 58 and its respective arm assembly 60. Like the positioning motors 58, the reducer gears 66 are mounted to the motor support beams 62. The reducer gears 66 have worm gear arrangements that reduce the speed of the positioning motors 58 to a desired rate. At the same time, because of the friction angle of the gearing, the reducer gears 66 provide braking to the arm assemblies 60 to prevent the top 14 from moving under changing loads at undesirable times.

Each arm assembly 60 includes a rotating arm 68 rotatably connected at one end to the output shaft of reducer gear 66 and thus to the positioning motor 58. The other end of the rotating arm 68 is rotatably connected to one end of a connecting arm 70 by a rotating ball joint, or rod end, 72. The other end of the connecting arm 70 is connected to a lower surface of the rear arm 24 of the top 14 by another rotating ball joint, or rod end, 74. The joints 72 and 74 operate so that the connecting arm 70 and the rotating arm 68 provide a rotating, variable angle joint to effect displacement of the top 14 and result in various combinations of pitch and roll during use of the motion platform 10. The dimensions of the arms 68 and 70 and the elevation of the positioning motor 58 and reducer gear 66 above ground level may be adjusted to control the maximum available pitch and roll angle.

The rotating arm 68 is rotatably connected to the output shaft of reducer gear 66 so as to be rotatable about the shaft axis a full 360 degrees. The ability of the rotating arm to rotate 360 degrees provides a wider range of motion, pitch and roll, for the motion platform than possible in conventional motion platforms restricted to quadrature motion, as seen in FIG. 2A. In addition, the ability to rotate 360 degrees means that, in a single complete rotation of the motor, the platform "reverses" direction (goes from up-down to down-up), yet the motor need not reverse direction. Reversing the direction of the motor requires more work by the motor. The dimensions of the rotating arm 68 and the connecting arm 70 and the elevation of the positioning motor 58 above the base 12, in combination, enable this 360-degree rotation.

When the top 14 is in a level start position, as shown in FIG. 2, the rotating arm 68 and the connecting arm 70 form an obtuse angle φ. A benefit of a start position where the arms 68 and 70 form a non-right angle is that the positioning motors 58 are required to use less power to initiate rotational movement than those operating under quadrature motion (see FIG. 2A). As a result, the motion platform 10 of the present invention may be run with smaller, and hence, more compact, lighter and inexpensive motors 58. In conventional motion platforms, the linkage between the motor and the platform top is at a 90-degree angle at the start position (see FIG. 2A), and thus motor must initiate movement when it is at its highest load.

The connecting arm 70 enables static alignment of the motion platform 10. The connecting arm 70 is hollow and has threaded ends, which connect respectively to the rotating ball joints or rod ends 72 and 74. Thus, the length of connecting arm 70 may be readily adjusted by threading either or both of the joints 72 and 74 into or out of the arm until the top 14 is in the desired position relative to base 12. In this manner, the connecting arm 70 may be used to align/level the motion platform 10.

The positioning motors 58 operate independently. In this way, the positioning motors 58 cause rotation of their respective rotating arms 68 to achieve whatever desired pitch, roll motion or vibration effects are desired. The motion platform 10 is thus capable of simulating real world movements by producing movement cues replicating or simulating those experienced in real world situations.

The control system for the motion platform 10 will now be described in conjunction with FIGS. 4–6. A microcontroller 80 is mounted to a lower surface of one of the motor support beams 62. The microcontroller 80 controls all functionality of the motion platform 10. Also mounted to the lower surface of the motion support beams 62 are four solid state relay and delay circuits 82, which will be referred to as relays 82, mounted two on each beam 62. These pairs of relays 82 are electrically connected to the microcontroller 80 and to each of the respective positioning motors 58. The relays 82 allow relatively instantaneous reversal of direction and control of rotation of the positioning motors 58.

The motion platform 10 further includes sensors. The sensors preferably are infrared emitting LEDs and phototransistors. First sensors 83 are mounted to a top surface of each of the reducer gears 66 to sense a position of a respective rotating arm 68. The first sensors 83 detect when the position of the respective rotating arms 68 are in the home position, as shown in FIG. 2. Light is reflected onto the respective sensor 83 from the rotating arm 68 as the rotating arm enters the home position. Second sensors 85 are mounted to the positioning motors 58. The positioning motors 58 may comprise A/C motors or DC motors, both of which have cooling fans with equally spaced blades. Each of the second sensors 85 senses the passage of an edge of each fan blades as that edge passes in front of the sensor 85.

The microcontroller 80 is responsive to digital input commands and to feedback signals generated by both sets of sensors 83 and 85. The microcontroller controls the start/stop, rotational direction, rotational speed and vibration of the positioning motors 58 in response to the input command signals supplied to the microcontroller 80 and the position, speed and extent of movement information provided by the sensors 83 and 85, as 30 will be fully described below.

Figure 5:
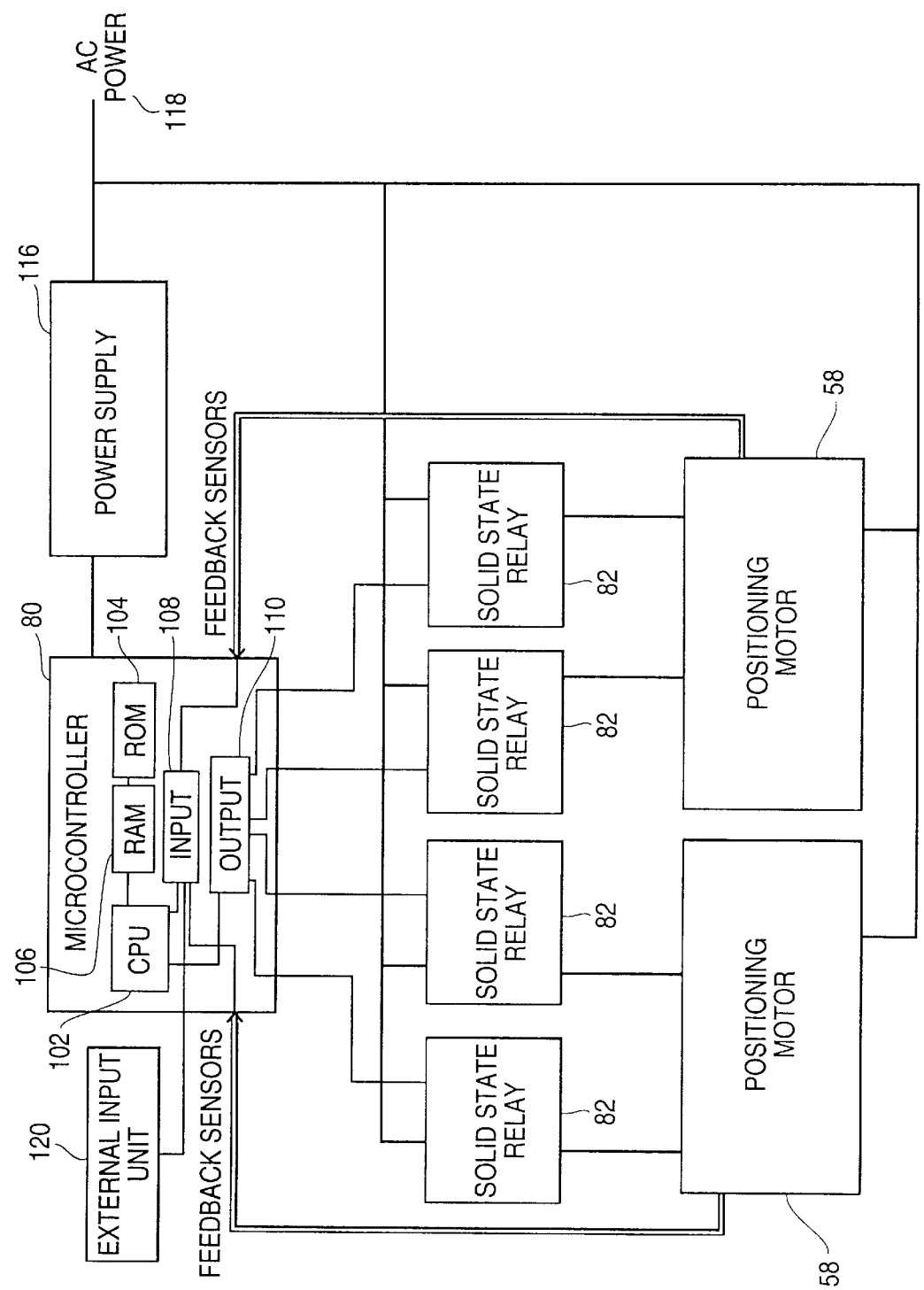
FIG. 5 is a block diagram illustrating the microcontroller and electrical system of the motion platform in accordance with the present invention.

FIG. 5 is a block diagram of the electrical control system of the motion platform 10 of the present invention. The microcontroller 80 includes a central processing unit (CPU) 102, storage in the form of ROM 104 and RAM 106, an input interface 108, and an output interface 110. The CPU 102 is preferably an 8-bit microcomputer optimized for real-time control applications. RAM 106 serves as temporary storage, and ROM 108 stores programming associated with operation of the motion platform 10, such as the programming associated with the flowchart shown in FIG. 6. The input interface 108 receives signals from sensors 82 that sense the position of the rotating arm 68 and the passage of the fan blades of the positioning motors 58, as described above. The input interface 108 transmits these sensor signals to the CPU 102 for processing. The CPU 102 sends processed signals to the output interface 110, which outputs signals to the solid state relays to drive the positioning motors 58, as desired. The microcontroller 100, through its output lines, controls the ON/OFF state and speed and direction of rotation of the positioning motors 114 based on sensor signals input into the microcontroller 100.

The relays 82 switch the positioning motors 114 ON and OFF at a rapid rate which is fast enough to control both the speed and the degree of rotation of the positioning motors 114. If it is desired to operate the motors 58 at full speed, for example, the relays 82 are turned on and kept on without interruption. If a reduced speed is desired, the relays 82 are switched on and off to supply the motors with an interrupted or pulsed input voltage. The lower the frequency of the pulse train, the slower the speed of the motor and vice-versa. In this way, by controlling the cycle of the relays 82, the motor speed is directly regulated. Similarly, by controlling the polarity of the motor input signal through the relays, the direction of rotation may be controlled. Finally, by combining control of the direction and speed signals fed to the relays 82, the motors can be caused to move in a stepwise or interrupted manner at any desired rate or degree, thereby imparting any number of desired vibration effects to the top 14 of the platform 10.

The motion platform 10 also includes a power supply 116 adapted to be connected to a suitable A/C power source 118 to provide power to the microcontroller 100.

The motion platform 10 is adapted to receive command signals from an external command signal input unit 120, such as a computer terminal or other ascii device capable of transmitting and receiving ascii characters, that electrically communicates with the CPU 102 through the interface input unit 108. Data parameters and operational commands may be supplied by the input source 120 in accordance with any desired sequence to produce a pattern or programmed sequence of movement of the top 14 of platform 10 relative to base 12. Such data and operational commands include: home-straight and level (H), pitch angle positive (P), pitch angle negative (N), acceleration (A, roll angle right (R), roll angle left (L), set speed (SP and SR) for each motor, set vibration (VP and VR) for each motor, status (Q), and ON/OFF (T).

The motion platform receives all its commands from the external input unit 120. Where the motion platform 10 is used as part of an arcade-type game system, for example, the external input unit 120 may consist of a joystick or controller operated by a player (or "rider") to produce signals recognizable by the microcontroller's CPU 102. If the motion platform 10 is used as part of a programmed ride, the external input unit 120 may consist of a programmed computer or date storage device capable of producing a running sequence of commands to cause the top 14 of the platform 10 to move in accordance with the desired motion sequence for the particular application.

As will be explained below, the microcontroller 100 needs to know two essential things. First, it needs to know what motion is desired. Second, it needs to know what movement of the platform has occurred to verify that the commands will be properly synchronized with the platform position. The first requirement is satisfied by the receipt of input commands from external input unit 120 as recognized by input interface 108 and CPU 102 of the microcontroller 80. The second requirement is provided by the sensors 83 and 85. Sensors 83 each produce a pulse when a fan blade of the motor passes within proximity of the sensor. The number of pulses indicates the amount of rotation of the motor shaft and, thus, the extent of movement of the connecting arm assembly 60. The frequency of the pulses indicates motor speed. Thus, by detecting and counting the pulses from sensors 83, the microcontroller can recognize the speed and extent of movement of each motor and can compute the nature and degree of motion undergone by top 14 relative to base 12.

The essential control sequences performed by microcontroller 80 in accordance 30 with the present invention are shown in FIGS. 6A–6E. As a first step, a power-on initialization procedure is performed in accordance with the flow diagram of FIG. 6A. The initialization procedure ensures that the motion platform 10 is level and that the microcontroller 80 is ready to receive interrupts from other control routines. In step 200 of this procedure, the power source 116 of motion platform 10 is turned ON. With the power ON, commands are sent by the CPU through the output interface 110 to the relays 82 of motors 58. This causes the motors 58 to move, causing the rotating arms 68 to move past their respective arm position sensors 83. The microcontroller detects the signal indicating passage of the arm through this "zero set" position and then begins to count the pulses from the motor fan blade sensor 85. When the predetermined number of pulses has been received to indicate that the arm has been moved to the "home" position corresponding to the level or horizontal orientation of the top 14, all other interrupts are initialized, as represented by step 204, and the motor and CPU are placed in the halt mode 206. In halt mode 206, the power to the system is ON, the top of the platform is steady and level, and the system is ready to receive motion commands.

Figure 6B:
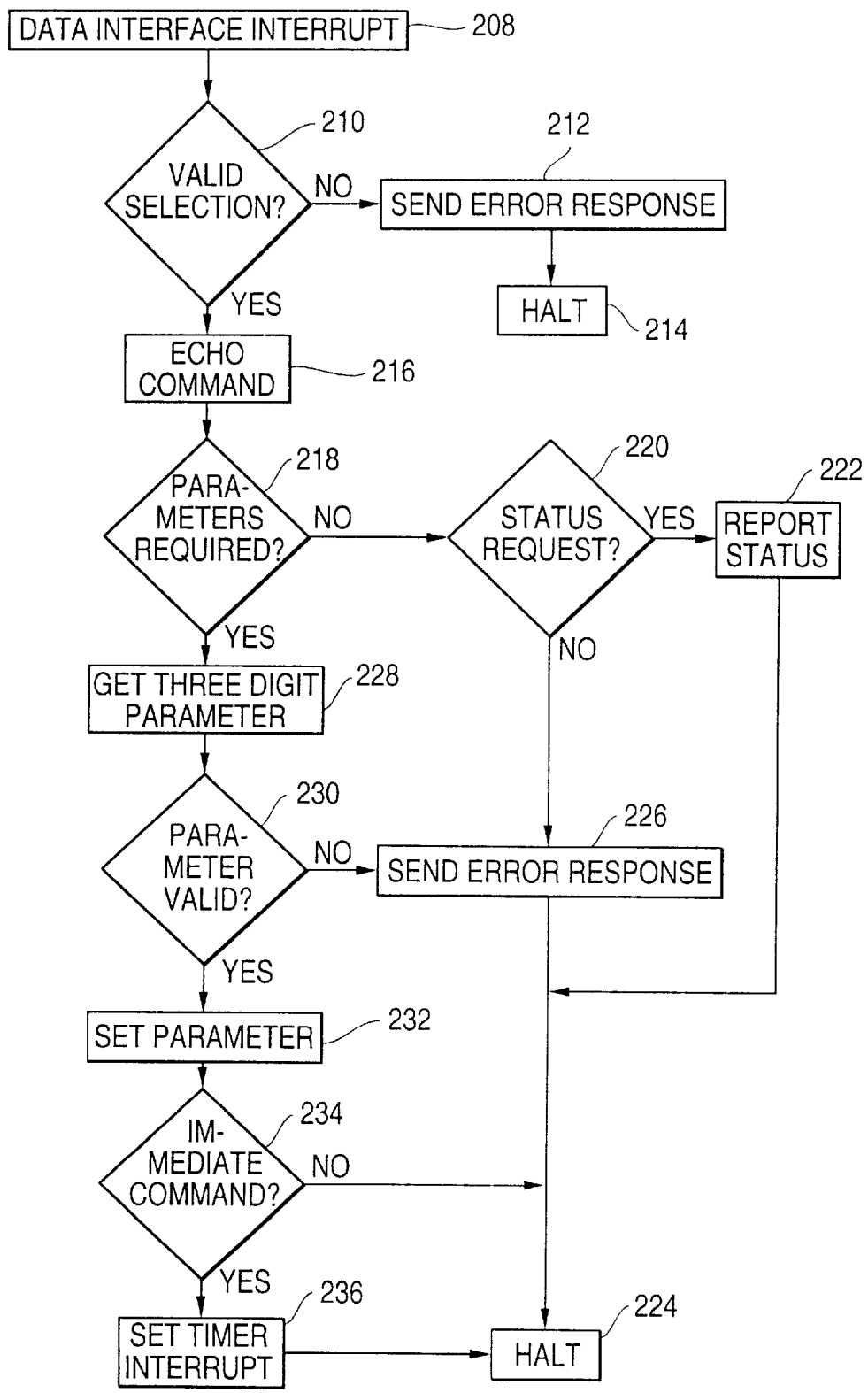

FIG. 6B illustrates the data interface interrupt sequence, which is the primary control sequence or loop for the system in accordance with the present invention.

A data interface interrupt 208 will occur when the CPU 102 receives data or character input signals from the external control unit 120, such as a computer or other device capable of supplying ascii characters. Initially, in step 210, the data interface interrupt queries whether the CPU 102 has received a valid command or input signal from the external input unit 120 that corresponds to built in parameters stored in RAM 106. As stated above, these commands include home-straight and level (H), pitch angle positive (P), pitch angle negative (N), acceleration (A), roll angle right (R), roll angle left (L), set speed (SP and SR) for each motor, set vibration (VP and VR) of each motor, status (Q), and ON/OFF (T). If the answer to this query is NO, then the CPU 102 sends an error response in step 212, and the loop halts in step 214. If the CPU 102 has received a valid command, then the command is echoed in step 216. The loop then queries in step 218 whether additional ascii characters representing parameters of the command are required. For example, if a set speed command SP or SR is received, the system will need to know what particular speed is desired. The system is programmed to recognize a three-digit numerical value from 0 to 999 to indicate a desired speed from zero to the maximum speed of the motors 58. While a three digit numerical value in the range of 0 to 999 has been selected in the present preferred embodiment, it should be appreciated that a lesser or greater range, with fewer or greater numbers could be implemented to accommodate the requirements of a particular application, depending upon the degree of accuracy and control desired.

If the echoed command does not require any additional parameters, then the interrupt answers NO and proceeds to step 220. Here, the CPU 102 conducts a status request, checking to verify that the command corresponds to a status command, namely H, Q, or T, each of which require only a single command without further specifying parameters. If the response to the status request is YES, then, in step 222, the CPU 102 reports the status and proceeds to a halt mode in step 224. If, on the other hand, the response to the status request query is NO, then, in step 226, an error response is sent before proceeding to a halt in step 224.

If, in step 218, a parameters requirement is recognized, then a retrieve sequence is initiated in step 228 to get the complete parameter from the CPU. The CPU 102 then checks to see if the retrieved parameter is valid in step 230. For example, if the system is set to look for a numerical value between 0 and 999, a valid parameter would be any number in that range. If the answer is NO, then an error response is sent in step 226, and the loop is halted in step 224. If the parameter is valid, however, the parameter is set in step 232.

The CPU 102 then checks for an immediate command in step 234. The immediate commands require action or movement of the platform and include commands P, N, R, and L. If the command is not an immediate command, then the interrupt loop is again halted at step 224. If an immediate command is detected, then the timer interrupt is set in step 236, and, thereafter, the loop is halted in step 224.

Figure 6C:
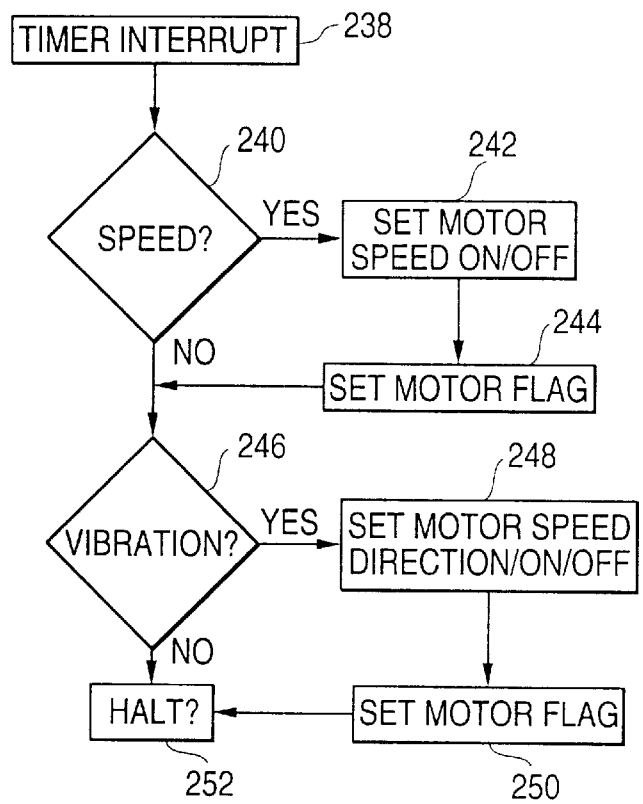

Since all of the parameters which call for an immediate command cause the motors to move some amount in a forward or reverse direction, the timer interrupt routine, shown in FIG. 6C, is used to set the motor/s speed/direction/ON-OFF status, according to commands in the form of data signals received from the external input unit 120. In the timer interrupt routine, begun at step 238, a speed inquiry is first performed in step 240. If this speed inquiry response is YES, then the motor speed is set in step 242, and a motor flag is generated in step 244 to indicate to the CPU what the motor is doing. The program then continues to perform a vibration inquiry in step 246. If the response to the speed inquiry in step 240 is NO, the program proceeds directly to the vibration inquiry in step 246.

If the response to the vibration inquiry is YES in step 246, then a motor Speed/Direction ON/OFF command is produced in step 248, and a motor flag is generated in step 250 to indicate what the motor is doing. The program then proceeds to a halt in step 252 to await the next interrupt. If the response to the vibration inquiry in step 246 is NO, then the program proceeds directly to the halt mode in step 252, as shown.

Figure 6D:
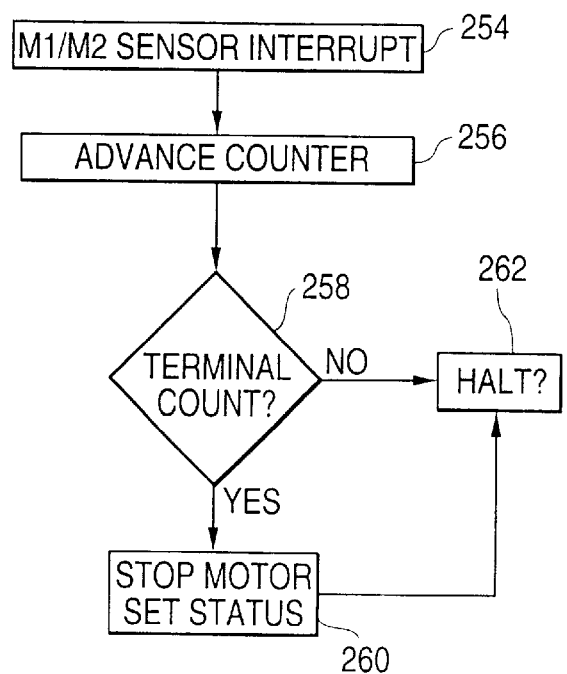

The microcontroller 102 also runs an M1/M2 (first motor/second motor) sensor interrupt routine, as shown in FIG. 6D. This routine monitors the second sensors 85 that detect passage of the fan blades of the positioning motors 58. The pulse count and pulse frequency provide extent of motion and speed information to the CPU, as described above.

In step 256, a counter in the CPU 102 is advanced when the sensor detects passage of a fan blade. At each count of the counter, the routine inquires whether a preprogrammed terminal count has been reached at step 258. The preprogrammed terminal count is determined based on how many revolution of the positioning motor are desired to move the rotating arm into the correct position to achieve the desired pitch angle or roll angle of the top of the motion platform. Once the terminal count has been reached, the routine proceeds to step 260 where the motor is stopped, and the motor status is set. Then the routine proceeds to a halt status in step 262. If the terminal count has not been reached at step 258, then the routine proceeds directly to the halt status in step 262.

To assure that proper synchronization of the system is maintained, the microcontroller 100 also runs a M1H/M2H sensor interrupt routine, as shown in FIG. 6E. This sequence is based on the recognition of the fact that a single shaft rotation of each of the motors 58 is integrally related to rotation of each of the connecting arms 68. Thus, if the motor fan contains twelve blades, as is quite common, twelve pulses of sensor 85 will signal one rotation of the motor shaft. From this, it can be appreciated that for each rotation of the arm 68, and then for each pulse of sensor 83, the number of pulses from the motor fan blade must be an even multiple of twelve. If the fan blade pulse count is not an integral multiple of twelve, the system will recognize that it is out of synchronism and the counters must be reset to re-calibrate the system.

The M1H/M2H sensor interrupt sequence of FIG. 6E accomplishes such re-calibration on initiation of the interrupt at step 264, performing a modulus twelve comparison of the counts of sensors 83 and 85, as described above, and resetting the sensor counts when necessary in step 266 before returning to a sequence halt mode in step 268.

The microcontroller 100 is thus able to control pitch, roll, speed and vibration movements of the motion platform 10 reliably, economically and efficiently. The motion platform is therefore uniquely adaptable to any number of entertainment and commercial simulator applications under any suitable manual or computer control as may be desired depending on the preferences of the end user.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims.

What is claimed is:

1. A motion platform comprising:
   a base;
   a top;
   a support member for supporting the top relative to the base with freedom of movement about at least one horizontal axis;
   a pair of positioning motor assemblies mounted to said base;
   an arm assembly extending between each of said positioning motor assemblies and said top, said arm assembly being responsive to rotary motion of a respective one of said positioning motor assemblies and adapted to rotate 360 degrees about said respective positioning motor assembly to effect relative movement of said top about said at least one axis; and
   a microcontroller electrically connected to said positioning motor assemblies for controlling a rotational speed and a rotational direction of said positioning motor assemblies and thus angular displacement of said top of said motion platform.

2. A motion platform as defined in claim 1, further comprising a first beam extending across said top and a second beam extending across said base,
   wherein said support member comprises a support beam extending between, and perpendicular to, said first beam and said second beam.

3. A motion platform as defined in claim 2, wherein said first beam bisects said top, said second beam bisects said base, and said support beam extends along an axis intersecting a center of said top and a center of said base.

4. A motion platform as defined in claim 3, wherein said base is generally rectangular.

5. A motion platform as defined in claim 4, wherein said top is generally rectangular.

6. A motion platform as defined in claim 2, wherein said support beam includes fins extending from an outer surface of said support beam to said second beam, said fins reinforcing said support beam.

7. A motion platform as defined in claim 2, further comprising a joint positioned between said support beam and said first beam, said joint mounted to said support beam to allow movement of said top relative to said support beam.

8. A motion platform as defined in claim 1, wherein a surface area of said base is greater than a surface area of said top.

9. A motion platform as defined in claim 1, wherein said base is composed of an aluminum alloy.

10. A motion platform as defined in claim 1, wherein said top is composed of an aluminum alloy.

11. A motion platform as defined in claim 1, further comprising solid state relay and delay circuitry electrically connected between said positioning motor assemblies and said microcontroller to allow relatively instantaneous reversal of a direction of rotation of said positioning motor assemblies.

12. A motion platform as defined in claim 11, wherein said base includes motor supports for supporting said positioning motor assemblies, and said solid state relay and delay circuitry is mounted to a bottom surface of at least one of said motor supports.

13. A motion platform as defined in claim 12, wherein
   said base and said top are generally rectangular and have a front arm, a rear arm, and two side arms,
   said motion platform further comprises a first beam bisecting said top and a second beam bisecting said base,
   said support member comprises a third beam extending between a center of said first beam and a center of said second beam, and
   said motor supports extend from said second beam to a top surface of said rear arm of said generally rectangular base, thereby elevating said positioning motor assemblies relative to said base.

14. A motion platform as defined in claim 1, wherein said positioning motor assemblies each include a positioning motor and a reducer gear, said reducer gear being coupled between respective ones of said arm assembly and said positioning motor.

15. A motion platform as defined in claim 14, wherein each said arm assembly includes a rotating arm for connection to an output of said reducer gear, a connecting arm for connecting a rear arm of said top to said rotating arm, and a joint for coupling said rotating arm to said connecting arm to allow angular displacement of said connecting arm relative to said rotating arm.

16. A motion platform as defined in claim 14, wherein said positioning motors of said positioning motor assemblies are A/C motors.

17. A motion platform as defined in claim 14, wherein said positioning motors of said positioning motor assemblies are DC motors.

18. A motion platform as defined in claim 1, wherein said positioning motor assemblies are elevated above said base.

19. A motion platform as defined in claim 1, wherein each said arm assembly includes a rotating arm for connection to an output of a respective one of said positioning motor assemblies, a connecting arm for connecting a rear arm of said top to said rotating arm, and a joint for coupling said rotating arm to said connecting arm to allow angular displacement of said connecting arm relative to said rotating arm.

20. A motion platform as defined in claim 19, wherein, when said top is at a start position, said rotating arm and said connecting arm form an obtuse angle.

21. A motion platform as defined in claim 1, wherein said arm assembly displaces said top of said motion platform where said arm assembly connects to said motion platform up to ±35 degrees from an imaginary plane level with a ground surface.

22. A motion platform as defined in claim 1, wherein said base includes motor supports for supporting said positioning motor assemblies, and said microcontroller is mounted to a bottom surface of at least one of said motor supports.

23. A motion platform as defined in claim 1, further comprising first sensors for sensing a position of each said arm assembly and second sensors for sensing rotation of each of said positioning motor assemblies.

24. A motion platform as defined in claim 23, wherein said positioning motor assemblies include a positioning motor having fan blades, and said second sensors monitor passage of each of said fan blades to sense rotation of the positioning motors.

25. A motion platform as defined in claim 1, wherein said top comprises a one-piece frame.

26. A motion platform as defined in claim 1, wherein said base comprises a one-piece frame.

27. A motion platform as defined in claim 1, further comprising a user module mounted to said top of said motion platform.

28. A motion platform comprising:

a base;

a top;

a support member for supporting the top relative to the base;

a pair of positioning motor assemblies mounted to said base, said positioning motors including fan blades;

an arm assembly extending between each of said positioning motor assemblies and said top, said arm assembly being responsive to rotary motion of a respective one of said positioning motor assemblies to move said motion platform, each said arm assembly including a rotating arm for connection to an output of said respective positioning motor assembly, a connecting arm for connecting a rear arm of said top to said rotating arm, and a joint for coupling said rotating arm to said connecting arm to allow angular displacement of said connecting arm relative to said rotating arm;

a microcontroller electrically connected to said positioning motor assemblies for controlling rotation of said positioning motor assemblies; and sensors coupled to said microcontroller and mounted on said positioning motor assemblies, each sensor supplying a pulse to said microcontroller each time a fan blade passes said sensor, wherein said rotating arm is rotatably connected to said respective positioning motor assembly to rotate 360 degrees relative to said respective positioning motor assembly.

29. A method for controlling movement of a motion platform comprising the steps of:

initializing the motion platform so that a top of the motion platform is level;

receiving data input into a data entry unit, the data being converted into signals for controlling activation, speed, and direction of rotation of positioning motors for positioning the motion platform;

activating the positioning motors in response to the received data;

when the positioning motors are activated, moving the positioning motors in a specific direction and at a specific speed in response to the received data to orient the motion platform;

sensing a home position of an arm assembly connecting one of the positioning motors to the motion platform; and recalibrating the home position of the arm assembly each time the home position of the arm assembly is sensed.

30. A method as defined in claim 29, wherein said data entry unit receives at least one of real-time data or predetermined data.

* * * * *